Jan. 16, 1940.  J. S. NICOLL ET AL  2,187,326
FRUIT CUTTING MACHINE
Filed July 28, 1937  7 Sheets-Sheet 1
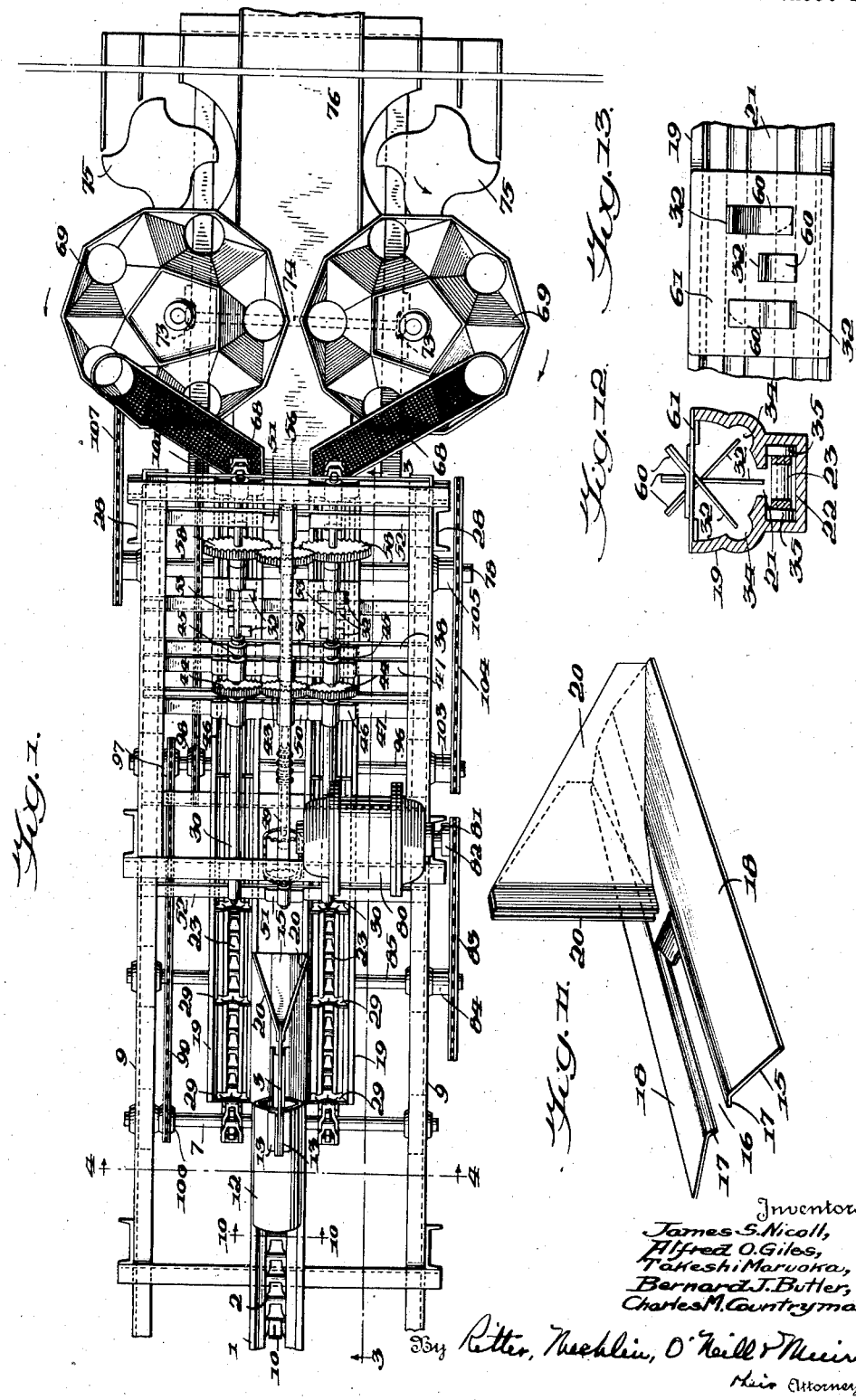
Inventors
James S. Nicoll,
Alfred O. Giles,
Takeshi Maruoka,
Bernard J. Butler,
Charles M. Countryman,
By Ritter, Mechlin, O'Neill & Muir
Their Attorneys

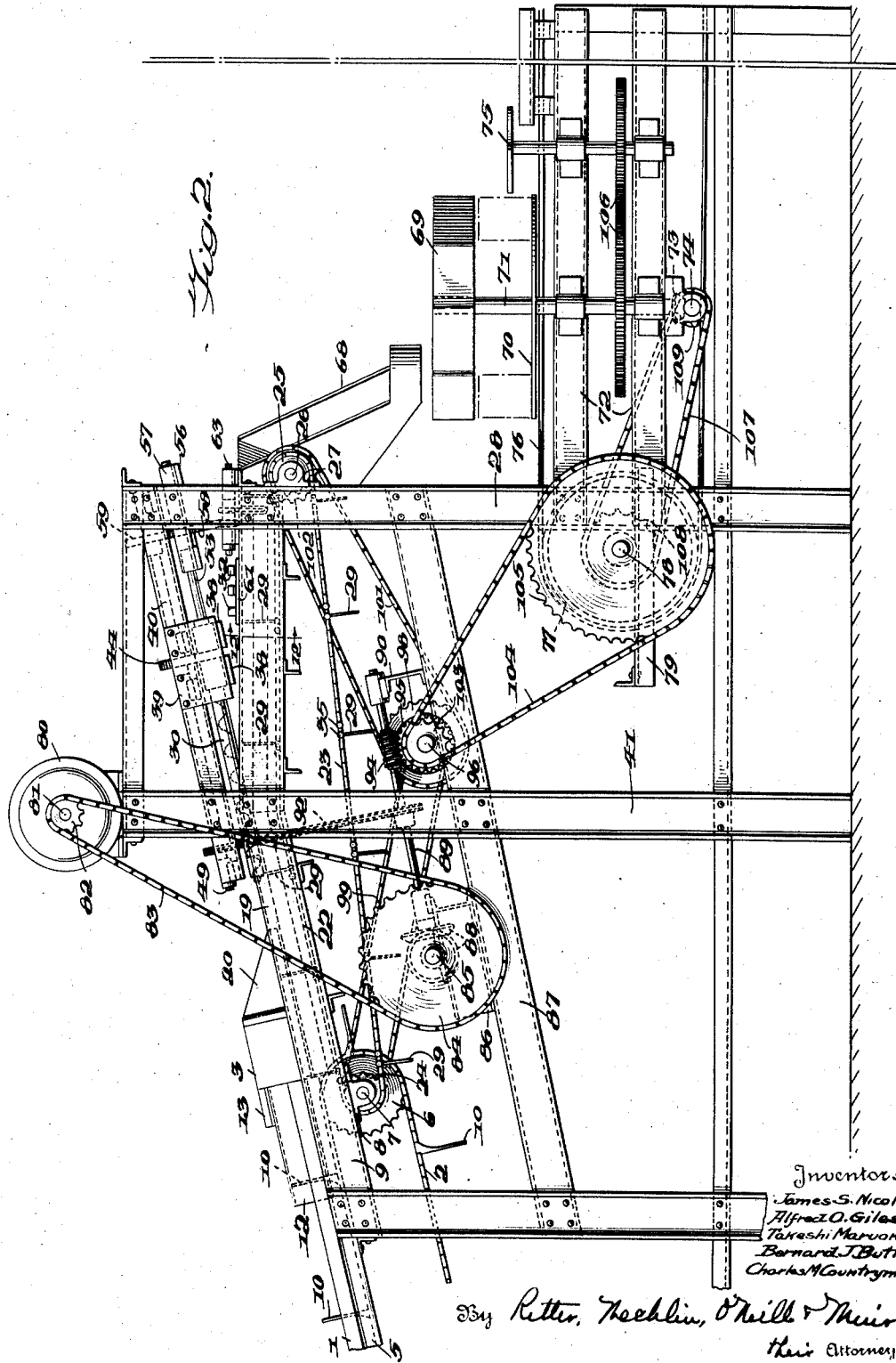

Jan. 16, 1940.  J. S. NICOLL ET AL  2,187,326
FRUIT CUTTING MACHINE
Filed July 28, 1937  7 Sheets-Sheet 3
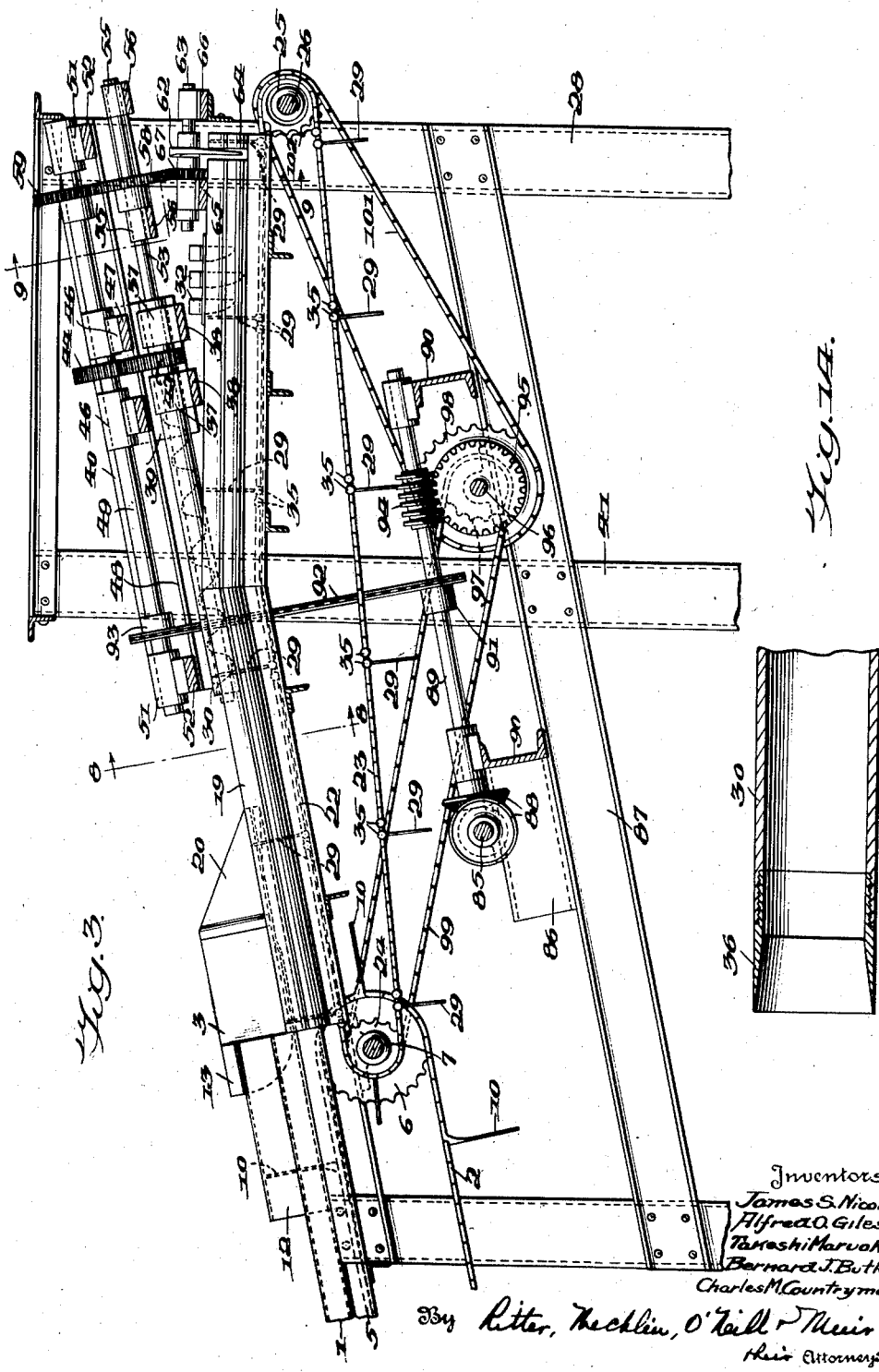

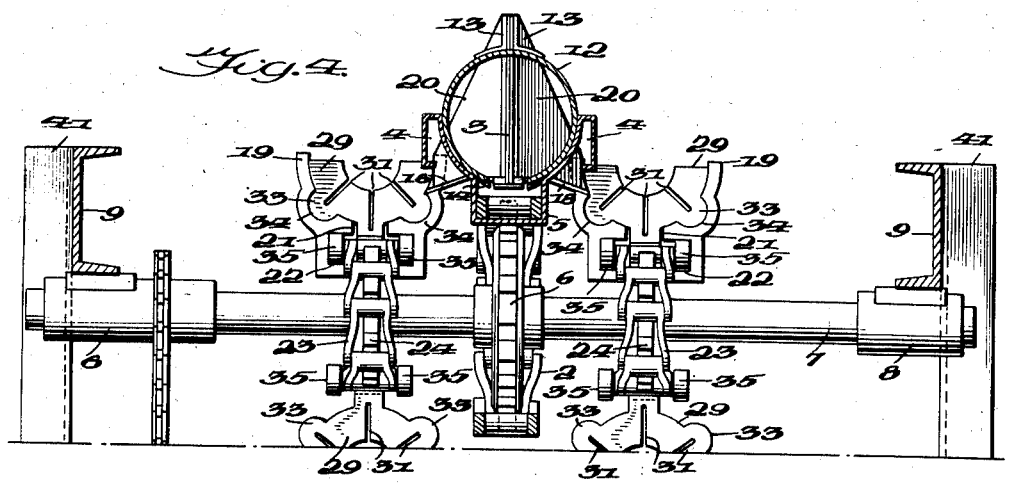

Jan. 16, 1940.                J. S. NICOLL ET AL                2,187,326
                              FRUIT CUTTING MACHINE
                              Filed July 28, 1937           7 Sheets-Sheet 5

Inventors
James S. Nicoll,
Alfred O. Giles,
Takeshi Maruoka,
Bernard J. Butler,
Charles M. Countryman,
By Ritter, Mechlin, O'Neill & Muir
Their Attorneys Jan. 16, 1940.  J. S. NICOLL ET AL  2,187,326
FRUIT CUTTING MACHINE
Filed July 28, 1937  7 Sheets-Sheet 6

Inventors
James S. Nicoll,
Alfred O. Giles,
Takeshi Maruoka,
Bernard J. Butler,
Charles M. Countryman,
By Ritter, Moehlen, O'Neill & Muis
Their Attorneys Jan. 16, 1940.    J. S. NICOLL ET AL    2,187,326
FRUIT CUTTING MACHINE
Filed July 28, 1937    7 Sheets-Sheet 7
Fig. 15.   Fig. 17.   Fig. 19.
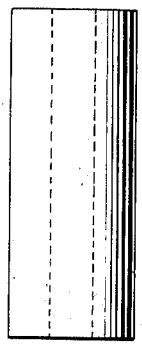
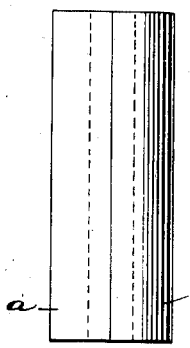
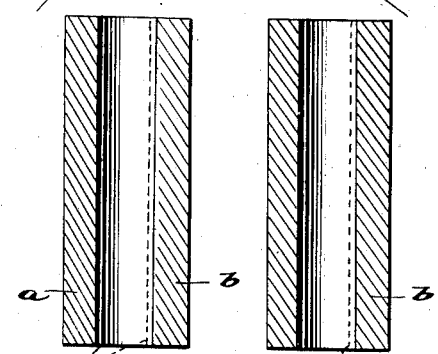
Fig. 16.   Fig. 18.   Fig. 20.
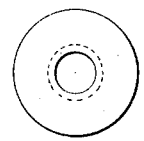
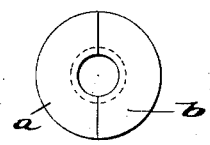
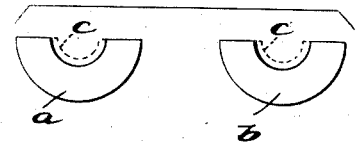
Fig. 21.   Fig. 23.
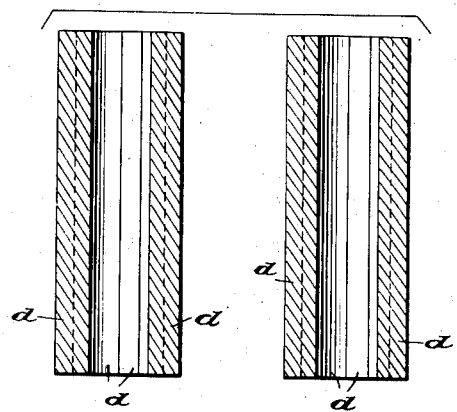
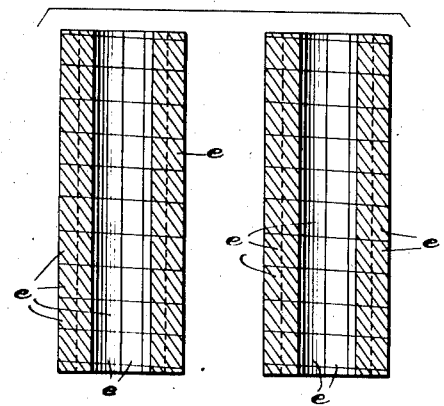
Fig. 22.   Fig. 24.
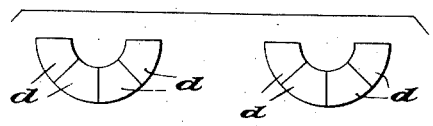
Inventors
James S. Nicoll,
Alfred O. Giles,
Takeshi Maruoka,
Bernard J. Butler,
Charles M. Countryman,
By Ritter, Mechlin, O'Neill & Muir
Their Attorneys Patented Jan. 16, 1940

2,187,326

UNITED STATES PATENT OFFICE 2,187,326

FRUIT CUTTING MACHINE

James S. Nicoll and Alfred O. Giles, Kahului, Takeshi Maruoka, Wailuku, Bernard J. Butler, Paia, and Charles M. Countryman, Kahului, Territory of Hawaii, assignors to Maui Pineapple Company, Ltd., Paia, Territory of Hawaii, a corporation of the Territory of Hawaii Application July 28, 1937, Serial No. 156,210

11 Claims. (Cl. 146—78)

Our invention relates to machines for cutting fruit, particularly pineapple, and its principal object is to cut pineapple into relatively small pieces, commonly called tidbits, of predetermined size without crushing, squeezing or bruising the fruit and to place the tidbits into cans.

Another object of the invention is to provide a machine for cutting the pineapple into tidbits wherein the fruit is advanced in continuous motion while being subjected to a plurality of successive cutting operations.

A primary feature of the invention consists in providing the fruit cutting machine with means for dividing the fruit into two parts and with mechanism for successively cutting each part of the fruit in a plurality of intersecting planes.

Another feature of the invention consists in providing the machine with successively acting cutting means for dividing the fruit into two parts, for cutting each part into a plurality of finger-like segments and for slicing the finger-like segments transversely into a plurality of pieces.

A further feature of the invention consists in providing the machine with means for dividing the fruit into two parts and with conveyer devices to which said parts are respectively delivered so as to be advanced to a plurality of additional cutting means, one of the additional cutting means being adapted to cut the fruit in the direction of its travel and another one of the additional cutting means being adapted to cut the fruit in a direction across its line of travel.

Another feature of the invention consists in providing means whereby the fruit is adapted to be successively cut in intersecting planes as it is being advanced by a conveyer device.

A still further feature of the invention consists in removing fibrous core material from the fruit as it is being advanced by the conveyer device.

Other and more specific features of the invention, residing in advantageous forms, combinations and relations of parts will hereinafter appear and be pointed out in the claims.

In the drawings:

Figure 1 is a plan view of the machine.

Figure 2 is a side elevational view of the machine.

Figure 3 is an enlarged sectional view taken on line 3—3 of Figure 1.

Figure 4 is an enlarged detail sectional view taken on line 4—4 of Figure 1.

Figure 5 is an enlarged plan view of the fruit dividing throat and separating means, together with adjacent parts of the machine.

Figure 11 is a perspective view of the fruit separating and guiding means.

Figure 12 is an enlarged detail section view taken on a line corresponding to line 12—12 of Figure 2.

Figure 13 is a plan view of the fruit segmenting knives and adjoining portions of the adjacent conveyer.

Figure 14 is an enlarged longitudinal sectional view of the forward end of the coring tube.

Figures 15 and 16 are side and end elevational views of a prepared pineapple cylinder for which the machine has been particularly designed to cut.

Figures 17 and 18 are respectively side and end elevational views of the prepared pineapple cylinder illustrating the manner in which it is first divided.

Figures 19 and 20 are views of the divided pineapple cylinder illustrating the fibrous core material to be removed.

Figures 21 and 22 are views of the divided pineapple cylinder after they have been cored and segmented.

Figures 23 and 24 are views of the divided pineapple cylinder after it has been cored, segmented and sliced.

Figure 6:
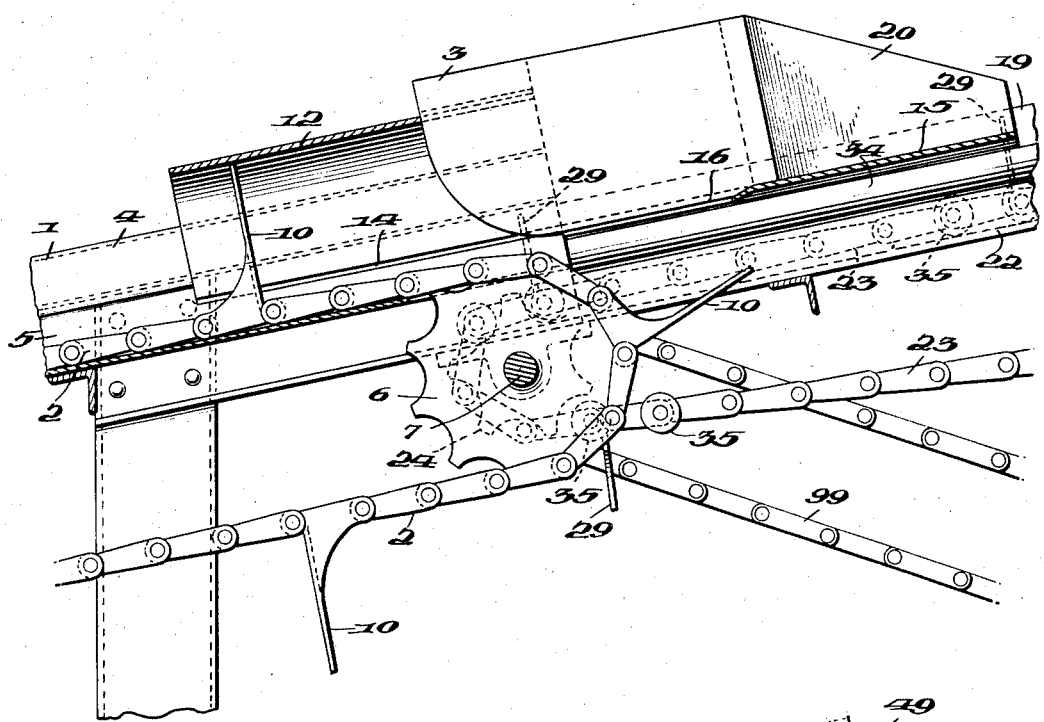
Figure 6 is a detail sectional view taken on line 6—6 of Figure 5.
Figure 7:
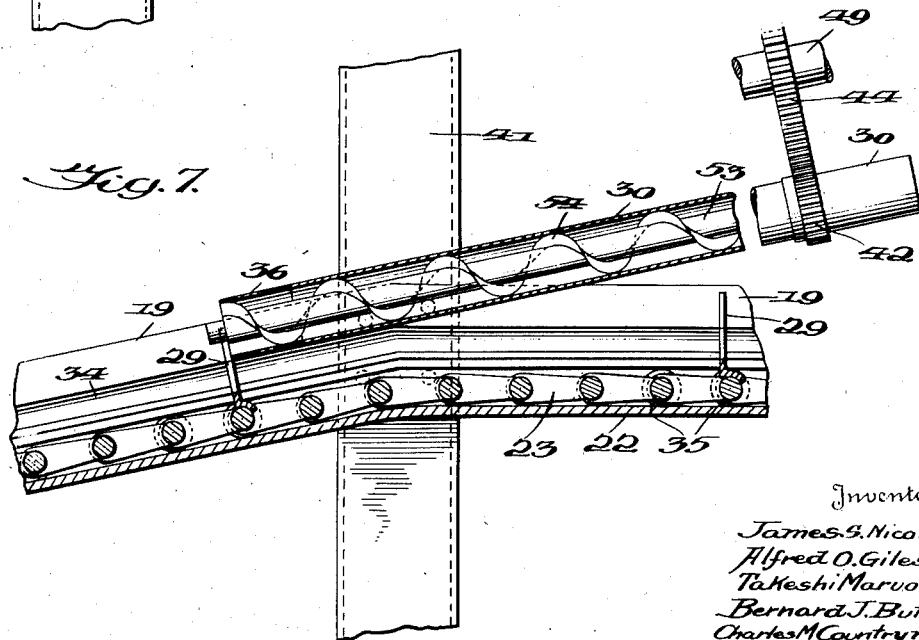
Figure 7 is an enlarged detail sectional view taken through one of the fruit coring tubes and illustrating the means for removing corings from the tube and also portions of an adjacent conveyer device.
Figure 8:
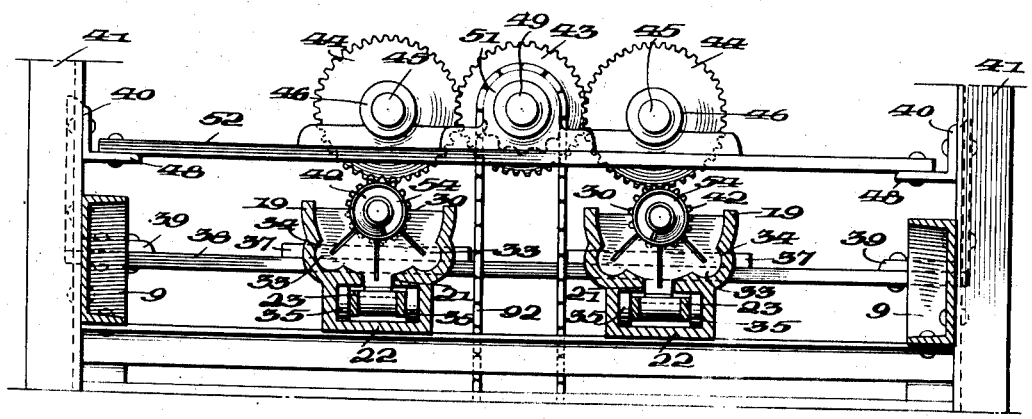
Figure 8 is an enlarged detail sectional view taken on line 8—8 of Figure 3.
Figure 9:
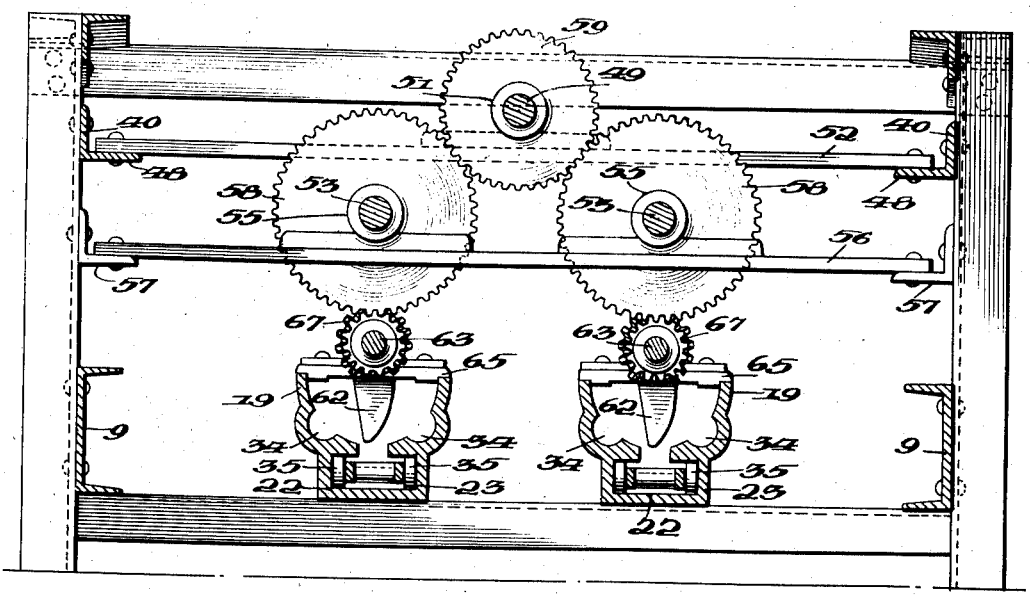
Figure 9 is an enlarged detail sectional view taken on line 9—9 of Figure 3.
Figure 10:
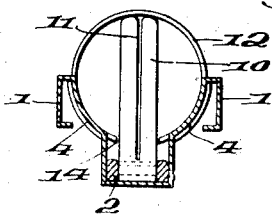
Figure 10 is an enlarged detail sectional view taken on line 10—10 of Figure 1.

Although the machine illustrated in the drawings has been primarily designed with a view to cutting cylinders of pineapple of fixed outside diameter and with a cylindrical core hole at the center, it will be evident that, by minor alterations and without departing from the spirit of the invention, the machine may be modified to cut pineapple of other than cylindrical shape as well as to cut other fruits of various shapes. The prepared pineapple cylinders, which may be most efficiently cut by the form of the invention illustrated in the drawings, are preferably manually trimmed and inspected to insure complete removal of skin and other undesirable matter which may not be removed in preparing operations. Moreover, the cylinder is preferably cored so that the core hole will be rimmed with fibrous material which is adapted to be removed by the cutting machine, but it will, of course, be understood that the cylinder need not necessarily be cored at all before being introduced into the machine.

As appears from the drawings and will be more evident from the following description, the first operation performed by the machine is the longitudinal splitting or dividing of the pineapple cylinders. This operation is advantageously performed by carrying the pineapple cylinders through a vertically disposed fixed knife by means of a conveyer with specially slotted attachments.

The second operation of the machine, which is performed in duplicate, involves the removal of the fibrous core material from the center core hole of each of the sections of the divided pineapple cylinder. This operation is preferably performed by carrying the pineapple half cylinders in continuous motion through rotating coring tubes by means of conveyors with specially shaped attachments.

The third operation in the machine, also performed in duplicate, involves the segmenting or longitudinal cutting of each of the cored pineapple half cylinders. This operation is performed by carrying the cored pineapple half cylinders in continuous motion past a set of knives which are preferably radially arranged by means of conveyers with specially slotted attachments.

The fourth operation of the machine, likewise performed in duplicate, involves the slicing or transverse cutting of the cored and segmented pineapple half cylinders, this operation being performed by carrying the cored and segmented half cylinders in continuous motion past a rotating knife.

The fifth operation of the machine, also performed in duplicate, involves the removal of small and undesirable chips or pieces of fruit from the prepared tidbits by passing the tidbits over inclined bar screens.

The sixth and last operation of the machine, performed in duplicate, involves the placing of the screened tidbits into empty cans. This operation is also performed in a continuous manner by means of rotating can carrier tables having funnel-shaped pockets for receiving the tidbits and directing them into cans.

Referring more in detail to the drawings, 1 indicates a trough or guide to which the prepared pineapple cylinders are delivered for advancement by a conveyor 2 to a vertically disposed knife 3 for longitudinally dividing the cylinders into half. The trough 1 is preferably constructed of non-corrosive sheet metal and it is formed with curved side walls 4 for supporting and guiding the pineapple cylinders. The bottom of the trough is depressed, as indicated at 5, to provide a housing for the conveyer 2 which may advantageously be of the endless chain type, the chain passing around and being driven by a sprocket wheel 6 mounted upon a shaft 7 which is journaled in bearings 8 rigidly secured to frame members 9 at opposite sides of the machine.

The conveyer is provided with a plurality of arms or the like 10 which project upwardly into the trough for advancing the pineapple therealong. These arms are suitably spaced along the conveyer to permit pineapple cylinders of maximum length, approximately 10½ inches, to be placed between succesive ones and each of the arms is preferably slotted as indicated at 11 to receive and pass on opposite sides of the dividing knife 3.

Before being acted upon by the knife 3, the fruit cylinders pass into a tubular member or throat 12 which acts as a guide to center the cylinders as they are being advanced during the cutting operation. The forward end of the knife 3 projects into the discharge end of the tubular throat and is rigidly secured thereto in any suitable manner, such as by angle brackets 13. The bottom of the throat is slotted as indicated at 14 to receive the conveyer arms 10 and the inside diameter of the throat preferably increases sufficiently from adjacent the leading or cutting edge of the dividing knife to allow the divided cylinders to readily pass through the remainder of the throat without being compressed as a result of the addition of the dividing knife to the cross sectional area of the pineapple cylinder.

From the throat 12, the divided pineapple cylinders discharge onto an apron or support 15 which has for a portion of its length a slot 16 bounded along its sides by downwardly converging portions 17 which serve to support the pineapple as it issues from the throat. The apron is also formed with oppositely disposed downwardly extending inclined portions 18 which respectively terminate adjacent the inner edges of a pair of parallel substantially U-shape troughs 19. Rigid with the apron and diverging from the rear end of the knife 3 are a pair of upstanding platelike members or guides 20 which are adapted to separate the two semi-cylindrical fruit sections and together with the apron cause the fruit sections to fall in opposite directions into the troughs 19 with the divided surfaces of the sections facing upwardly.

For a purpose which will hereinafter appear, the U-shape troughs 19 are preferably inclined for a portion of their length and horizontal for the remainder; and it is because of the inclination of the portions of the troughs to which the half cylinders are initially delivered that the trough 1 is also preferably inclined. As troughs 19 are duplicates and as duplicate mechanisms are provided for advancing the semi-cylindrical sections of pineapple along the troughs and also for coring and for further dividing the pineapple, corresponding portions of the troughs and their associated parts are identified in the drawings by similar reference numerals.

The troughs 19 may be each conveniently made in bronze or stainless steel having a semi-circular section of approximately the same diameter as the pineapple sections, and each is provided with a longitudinally extending centrally disposed slot 21 which communicates with a compartment or the like 22 forming a housing and trackway for an endless conveyer 23 for advancing the fruit along the trough. The conveyers may advantageously be of the endless chain type and each passes around an idler sprocket 24 and a driving sprocket 25, the sprocket 24 being loosely mounted on shaft 7 and sprocket 25 being keyed to a shaft 26 which is journaled at its opposite ends in bearings 27 rigidly secured to upright frame members 28 of the machine.

The conveyers 23 are each provided with a plurality of plate-like arms or attachments 29 which extend upwardly into the troughs 19. Each of the arms is preferably in the form of a segment of an annulus, the exterior diameter of which is slightly less than the diameter of curvature of the trough and the interior diameter of which is sufficient to accommodate the coring tubes 30 to be hereinafter described. Like the arms 10 of conveyer 2, arms 29 of conveyers 23 are spaced sufficiently far apart to receive between them half sections of pineapple of maximum length and each of the arms is provided with a plurality of radial slots 31 to receive the radially disposed segmenting knives 32, to be later described. To rigidify the arms adjacent the ends of some of the slots 31, they may be conveniently formed with laterally projecting stiffening lugs 33 which are adapted to extend into longitudinally extending grooves 34 formed in the interior of the troughs.

Each link of the conveyers 23 to which the arms 29 are secured are provided with two pairs of rollers 35 mounted upon pins or the like extending through the links. These rollers guide the links carrying the arms as they travel in the trackway 22 which is preferably machined with precision, and they prevent any lateral movement of the arms which would cause misalignment of the slots 31 with the segmenting knives 32.

After being delivered to the conveyers 23, the semi-cylindrical sections of pineapple are first carried past the coring tubes 30 which remove the fibrous core material remaining in the pineapple. The tubes inclined upwardly at the same angle as the inclined portions of troughs 19 and each of them is provided with a removable cutting head 36 which is beveled on its interior surface. To insure a clean removal of the core material, the tubes are preferably rotated and, for this purpose, each of them is journaled in a pair of bearings 37 secured to members 38 which extend transversely of the machine and are connected at their ends to inwardly extending flanges of brackets 39 which depend from inclined frame members 40 disposed on opposite sides of the machine and respectively connected to upright frame members 28 and 41.

Intermediate their bearings 37, the coring tubes are respectively provided with ring gears 42 which are driven from a single gear 43 through the intermediacy of idler gears 44 to cause the tubes to rotate in the same direction. The idler gears are mounted on stub shafts 45 which are journaled at their opposite ends in bearings 46 carried by members 47 secured in overlapping relation to the inwardly projecting flanges 48 of the inclined frame members 40. The driving gear 43 is mounted upon a relatively long inclined shaft 49 which, in addition to being journaled on opposite sides of the gear in bearings 50 carried by the transverse members 47, is journaled adjacent its ends in bearings 51 mounted upon transverse members 52 which are likewise secured to the inturned flanges of frame members 40.

Extending within the tubes are shafts 53, each of which is provided with a helix 54 forming a screw conveyer for withdrawing from the tubes the fibrous core material removed from the pineapple sections. The rear ends of shafts 53 which project beyond the corresponding ends of the coring tubes are respectively journaled in a pair of bearings 55 carried by transversely extending members 56 which are connected at their opposite ends to inturned flanges of angle brackets 57 respectively secured to the upright frame members 28. For rotating shafts 53, each of them is provided between bearings 55 with a gear 58 which, in order that the conveying screw will rotate in the opposite direction to the coring tube in which it is disposed, meshes directly with a gear 59 carried by shaft 49.

After passing the coring tubes, the pineapple half cylinders are advanced by the conveyers 23 in troughs 19 to the segmenting knives 32. At points slightly beyond the cutting ends of the coring tubes, the troughs 19 angle downwardly and continue in substantially horizontal planes so that the mechanism for supporting and rotating the tubes will not interfere with the advancement of the pineapple by the conveyers and the placing of the segmenting knives and other mechanism, to be later described, on the trough sections in relatively close proximity to the cutting ends of the tubes.

While three segmenting knives are illustrated in the drawings, it will, of course, be understood that any number may be used and that, although they are preferably radially disposed, they may, of course, be arranged in any manner to divide the pineapple half cylinders into segments of the desired shape. It has been found advantageous to space the cutting edges of the segmenting knives from each other longitudinally of the trough and they may be conveniently supported by being rigidly connected by angle brackets 60 to a plate member 61 which rests upon and is secured in any suitable manner to the associated trough. The slots 31 in the arms 29 of the conveyers correspond in arrangement with the segmenting knives and are thus capable of advancing the pineapple sections in continuous motion past the knives without fouling them.

After passing the knives 32, the segmented half cylinders of pineapple are advanced to mechanism whereby the fruit is subjected to the slicing operation to divide the segments into small pieces or tidbits. The slicing mechanism associated with each trough comprises a rotating knife 62 mounted on a shaft 63 whose axis preferably lies in a perpendicular plane passing through the center line of travel of the fruit. The shaft 63 is so positioned that the knife blade slices the pineapple half cylinders during approximately one quarter of its revolution and the knife blade is set to cut helical elements to insure an unrestricted slicing of the pineapple on a plane determined by the resultant motion of the advancing pineapple and of the rotating knives.

This slicing operation is possible in continuous motion, with accurate timing of the slicing knives and the conveyers 23, as a result of placing the axes of rotation of the knives in such position above the centers of the pineapple half cylinders as to permit the plate-like arms 29 of the conveyers to pass through the plane of knife rotation during that part of the knife revolution the blades are out of engagement with the pineapple and clear of all moving parts.

The side walls of the troughs are slotted, as indicated at 64, to receive the slicing knives and the shafts on which they are mounted are respectively journaled at their opposite ends in bearings, one of which is carried by a plate-like member 65 mounted upon the trough and the other of which is carried by an angle member 66 which extends transversely of the machine and is secured to the upright frame members 28. Shafts 63 may be conveniently rotated by being respectively provided with gears 67 which mesh with gears 58 on shafts 53. Gears 67 are each slightly beveled to compensate for the difference in angularity of shafts 53 and 63.

After passing the slicing knives 62, the cored, segmented and sliced pineapple half cylinders discharge from the troughs 19 into chutes 68 whereby the tidbits are conducted by gravity to a rotatable member 69 having a plurality of funnel-shaped pockets beneath which empty cans are supported on a rotating carrier table 70. The bottoms of the chutes 68 are of bar screen formation to enable very small pieces or chips of pineapple to drop therethrough.

The rotatable member 69 and the can carrier table 70 associated with each chute 68 are mounted upon a vertical shaft 71 journaled in bearings carried by suitable frame members 72 of the machine. Shafts 71 are rotated in opposite directions through the intermediacy of beveled gears 73 by a horizontally disposed shaft 74 which is driven in timed relation with the conveyers for advancing the fruit so that each empty can receives the tidbits cut from each half cylinder of pineapple. Any suitable can feeding mechanism, such as indicated at 75, may be employed for delivering empty cans in timed relation to the can carrier tables 70. The can feeding mechanisms may be conveniently actuated through suitable gearing by shafts 71.

After receiving the tidbits, the filled cans are wiped from the can carrier tables as they rotate by any suitable means, such as fixed guides (not shown), onto an endless belt 76 whereon they may, if necessary, be manually patched to proper weight before processing. The endless conveyer passes around and may be conveniently driven by a pulley 77 mounted upon a shaft 78 which extends transversely of the machine from one side to the other and is journaled in suitable bearings mounted upon frame members 79.

All of the moving parts of the machine may be actuated from any convenient source of power, such as an electric motor 80, which may be mounted on the machine in any desirable location. The shaft 81 of the motor may be provided with a sprocket wheel 82 for driving a roller chain or the like 83 which passes around sprocket 84 carried by a shaft 85 which extends transversely of the machine and is journaled in bearings supported by members 86 connected to longitudinally extending frame members 87 of the machine. Extending at right angles to shaft 85 and driven thereby through beveled gears 88 is a shaft 89 mounted in bearings supported by transverse members 90 which are also connected to frame members 87 of the machine. Intermediate its ends, shaft 89 has a sprocket 91 for driving a roller chain or the like 92 which passes around a sprocket wheel 93 on shaft 49. Motion being thus imparted to shaft 49, it will be perceived that the coring tubes are caused to rotate through gears 42, 43 and 44, that the screws for withdrawing core material from the tubes are operated through gears 58 and 59 and that the slicing knives are operated through gears 58, 59 and 67.

Adjacent the sprocket 91, shaft 89 is also provided with a worm 94 which, through a worm gear 95, imparts rotation to a shaft 96 which is journaled in bearings mounted on the inclined frame members 87 of the machine.

Adjacent one end, shaft 96 is provided with a pair of sprocket wheels 97 and 98, respectively. Sprocket 97 drives a chain 99 which passes around a sprocket 100 mounted upon shaft 7 which carries sprocket 6 for actuating conveyer 2. The sprocket 98 drives a chain 101 which passes around a sprocket 102 mounted on shaft 26 which carries sprocket 25 for actuating conveyer 23.

At its other end, shaft 96 is provided with a sprocket 103 for driving a chain 104 which passes around a sprocket 105 mounted on one end of shaft 78 on which pulley 77 is mounted for driving the endless conveyer belt 76. In addition to driving conveyer 76, shaft 78 may also be employed for actuating the shaft 74 which drives the can carrier table and through gears 106 also drives the can feeding device 75. Accordingly, rotation may be imparted to shaft 74 from shaft 78 by a chain 107 which passes around a sprocket 108 on shaft 78 and sprocket 109 on shaft 74.

This system of shafts, gears, sprockets and chains is designed to operate in proper timed relation so as to coordinate the functions of all of the moving parts of the machine to the end that the fruit is advanced in continuous motion from the time it is fed to the machine until the filled cans containing small pieces or tidbits of the fruit are discharged from the machine.

The successive cutting operations to which the pineapple is subjected in its passage through the machine are shown in Figures 17 to 23, inclusive, and one of the cored pineapple cylinders the machine is especially designed to receive is illustrated in Figures 15 and 16. The cylinder is shown in Figures 17 and 18 as having been divided into semi-cylindrical sections $a$ and $b$ by the knife 3. The fibrous core material which is removed from the sections by the coring tubes 30 is designated by the reference letter $c$ in Figures 19 and 20 which illustrate the relative positions of the sections after they have been separated by the diverging plate members 20 and deposited in the troughs 19. The finger-like segments into which the half cylinders are divided by the radially arranged segmenting knives 32 are indicated at $d$ in Figures 21 and 22 and the tidbits into which the segments are sliced by the rotating knives 62 are shown at $e$ in Figures 23 and 24.

It will be evident that, by our invention, the fruit may be subdivided into very small pieces without subjecting it to either lateral, longitudinal or internal pressure of such magnitude as would result in rupturing the fruit cells and the consequent release of juice. Many modifications of the specific embodiment of the invention illustrated in the drawings, such, for example, as altering the sequence of the various cutting operations, may, of course, be made without departing from the scope of the invention as defined in the appended claims.

What we claim is:

1. A machine for cutting fruit comprising a conveyer device for advancing the fruit to be cut, said device including a trough having a recess in the lower portion thereof and an endless chain disposed within the recess having pusher arms projecting upwardly into the trough for propelling the fruit therein, a knife projecting into the trough for dividing the fruit into two parts, substantially parallel conveyer devices disposed on opposite sides of said knife, means rigid with the knife for separating said parts of the fruit and respectively delivering them to said parallel conveyer devices, means associated with each parallel conveyer device for cutting the part of the fruit advanced thereby into a plurality of finger-like segments, and means also associated with each of the parallel conveyers for slicing said finger-like segments transversely.

2. A machine for cutting fruit including a conveyer for advancing the fruit to be cut comprising a stationary trough having a relatively movable means associated therewith, a knife fixedly associated with said trough for dividing the fruit into two parts, laterally spaced conveyer devices disposed on opposite sides of said knife, means rigid with the knife including substantially vertical members diverging rearwardly therefrom for separating said parts of the fruit and for respectively delivering them to said conveyer devices, means associated with each conveyer device for cutting said parts of the fruit as they are being advanced by said devices into a plurality of finger-like segments, and means also associated with each conveyer device for slicing said finger-like segments transversely as they are being advanced by said devices.

3. A machine for cutting fruit including means for dividing the fruit into two parts, substantially parallel laterally spaced conveyer devices arranged on opposite sides of said dividing means, means rigid with the dividing means for separating said parts of the fruit and respectively delivering them to said conveyer devices, said last named means including a member spanning the space between the conveyer devices and vertically disposed means diverging rearwardly from the dividing means, and a plurality of means associated with each conveyer device for subdividing the part of the fruit delivered thereto as it is being advanced by said device, one of said subdividing means being adapted to cut the fruit in the direction of its travel and another of said subdividing means being adapted to cut the fruit in a direction across its line of travel.

4. A machine for cutting fruit including means for cutting the fruit into two substantially equal parts, conveyer devices to which said parts are respectively delivered, each of said conveyer devices including a trough and endless means for propelling the fruit in the trough, a plurality of radially disposed knives mounted on and extending downwardly into said trough for cutting the fruit as it is being propelled by the endless means into a plurality of finger-like sectors, and rotating means whose axis of rotation is substantially parallel to the direction of movement of said endless means associated with each trough for transversely slicing the finger-like sectors as they are being propelled into a plurality of pieces.

5. In a machine for cutting fruit, the combination of means for cutting the fruit, a conveyer device including a trough for receiving the fruit and endless means movable within the trough for advancing to said cutting means sections of the fruit having exposed fibrous core material, rotatable tubular means disposed above the conveyer in advance of said cutting means for removing the fibrous core material from the sections of the fruit as they are being continuously advanced by the conveyer to the cutting means, and means disposed within the tubular means for withdrawing core material entering the latter.

6. In a machine for cutting cylinders of pineapple, the combination of vertical means for severing the pineapple longitudinally into half cylinders, a conveyer device to which half cylinders of pineapple are respectively delivered for advancement to cutting means, said conveyer device including a trough and endless means movable within the trough, means for causing the half cylinders to be delivered to the conveyer device with the severed surfaces thereof facing upwardly, and rotatable tubular means disposed above the conveyer device for removing fibrous core material from the half cylinders as they are being continuously advanced by the conveyer.

7. In a machine for cutting fruit, the combination of a trough of substantially semi-cylindrical shape in cross section for receiving a section of pineapple of similar cross sectional shape, the interior of said trough being provided with a plurality of longitudinally extending grooves, means having a plurality of pusher arms for advancing the pineapple in the trough, a plurality of radially disposed knives projecting into the trough in the path of travel of the pineapple for cutting the latter into a plurality of segments, said pusher arms being slotted to receive said knives and being formed with outwardly projecting stiffening lugs extending into said grooves of the trough.

8. In a machine for cutting fruit, the combination of a stationary trough semi-cylindrical in vertical cross section and having a recess opening into the lower portion thereof, movable chain means guidingly received in said recess below said trough and having a plurality of intermittently spaced pusher arms projecting into said trough, a tubular member secured to said trough adjacent one end thereof for guidingly receiving said fruit, and stationary blade means associated with and having a portion thereof extending into said tubular member; said tubular member having an inner surface inclined outwardly toward a discharge end thereof to compensate for the thickness of said cutting means.

9. In a machine for cutting fruit, the combination of a stationary trough for receiving the fruit having a recess in its lower portion, an endless chain disposed within the recess and having a plurality of pusher arms projecting upwardly into the trough for propelling fruit along the latter, a tubular member mounted on the trough through which the fruit is adapted to be continuously propelled, said tubular member having a longitudinally extending slot communicating with said recess, and stationary cutting means having a portion thereof positioned in and bisecting said tubular member so as to be disposed in the path of travel of the fruit for cutting it into a plurality of parts as it is propelled through said member, each of said pusher arms having a slot enabling portions thereof to pass on opposite sides of said cutting means, said tubular member having a portion of an inner surface thereof adjacent said cutting means inclined to permit the free passage of said cutting means through said fruit.

10. In a machine for cutting fruit, the combination of a trough for guidingly receiving the fruit having a recess in its lower portion, a tubular member mounted on the trough having a longitudinally extending slot communicating with said recess, an endless chain guidingly disposed within the recess and below the trough having pusher arms projecting upwardly into the trough for continuously propelling the fruit along the latter and through said tubular member, and a stationary knife projecting into and bisecting the discharge end of the tubular member for cutting the fruit longitudinally into two substantially equal parts as it is being propelled through said member.

11. In a machine for cutting fruit, the combination of a conveyer device comprising a stationary member and a relatively movable member for advancing the fruit to be cut, rotatable tubular means extending parallel with and disposed above the device for removing fibrous core material from the fruit, a plurality of knives spaced from said tubular means and fixed with respect to said stationary member, said knives being disposed at an angle to each other and extending into the path of travel of the fruit for dividing it into a plurality of segments, said conveyer device changing direction between said tubular means and knives by being inclined upwardly adjacent said tubular means and substantially horizontal adjacent said knives and being adapted to advance said fruit in continuous motion as it is being cored and divided.

JAMES S. NICOLL.
ALFRED O. GILES.
TAKESHI MARUOKA.
BERNARD J. BUTLER.
CHARLES M. COUNTRYMAN.